Feb. 27, 1962 W. CZULIUS 3,023,360
MEASUREMENT METHOD AND APPARATUS
Filed June 30, 1959

United States Patent Office 3,023,360
Patented Feb. 27, 1962

3,023,360
MEASUREMENT METHOD AND APPARATUS
Werner Czulius, Erlangen, Germany, assignor to Siemens-Schuckertwerke Aktiengesellschaft, Erlangen, Germany, a corporation of Germany
Filed June 30, 1959, Ser. No. 824,123
Claims priority, application Germany July 12, 1958
7 Claims. (Cl. 324—68)

The invention relates generally to a method and apparatus for measuring time intervals between random events and more particularly to a method and apparatus for accomplishing such measurement in terms of amplitude difference.

In scientific research as well as in engineering arts, often the problem is encountered to determine the intervals of momentarily recurrent phenomena within a certain period of time. Such problems are encountered with particular frequency in the field of atomic and nuclear physics. The present invention provides a method and apparatus to convert the time intervals between the phenomena which, for example, may be impulses or may be represented by impulses, beginning from a zero signal, into amplitudes, proportional with respect to time of equal width rectangular impulses, and then to measure the resultant amplitude distribution by means of an impulse analyzer.

The advantage of the method and apparatus according to the invention resides primarily in its simplicity and in the well known efficiency of the Hall generators to be used in connection therewith, and particular Hall devices wherein the semiconductor element has a carrier mobility of at least 6000 cm.$^2$/volt. sec. Hall generators of this type have been described lately in various patents and other publications for example, "Neue Werkstoffe mit grossem Halleffekt und grosser Widerstandsaenderung im Magnetfeld" by H. Welker, ETZ–A, vol. 76, 1955, pages 513 to 517. On principle, however, there may also be used Hall devices utilizing different semiconductor elements, such as germanium or silicone. Briefly described, the Hall generator is essentially a device that provides a voltage output proportional to the product of two quantities (a) the current being fed to it, and (b) the magnetic field perpendicular to it.

The use of Hall generators as a multiplying element has the additional advantage and a distinction over other electronic multipliers in that no additive constants are introduced into the result of measurement.

The object of the invention is to provide a method and apparatus for determining the intervals of momentarily recurrent events, or phenomena, in a predetermined period of time.

Another object of the invention is to provide a method and apparatus for measuring the intervals of momentarily recurrent phenomena or events, within a certain period of time utilizing a sawtooth wave and pulses to convert time intervals into amplitude differences.

Another object of the present invention is to provide a method and apparatus for determining the time intervals between random events utilizing a Hall generator.

Further objects and advantages of the invention will be readily apparent from the following detailed description taken in conjunction with the drawing, in which.

The invention resides in that the amplitude distribution, proportional with time, is obtained by multiplying a sawtooth impulse increasing linearly with respect to time within said predetermined period of time with the events occurring within said period of time and represented by impulses, the multiplication being performed by means of a Hall generator such that the sawtooth impulse is used to control the magnetic excitation of the Hall generator, and the impulses representing the occurrence of the events or phenomena control the electrical energization of the Hall generator. The resulting Hall voltage for the occurrence of each event will have an amplitude related to the time interval between the random occurring events.

Figure 1:
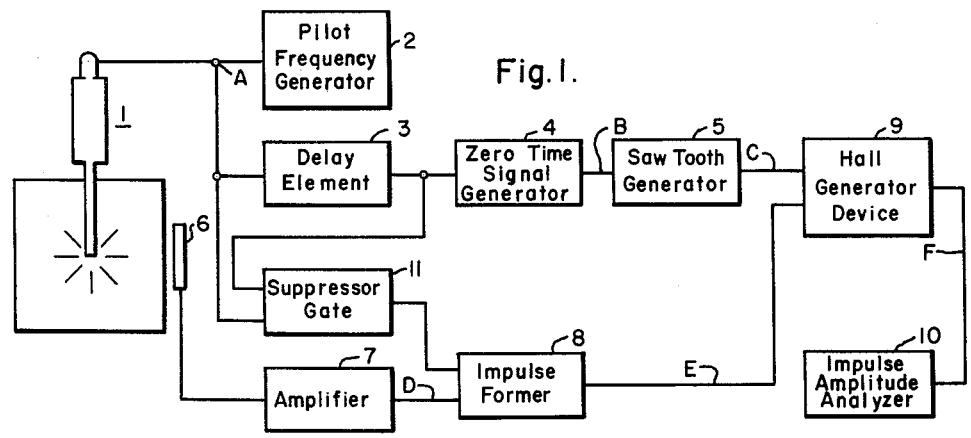
FIGURE 1 is a block diagram of an illustrative embodiment of the invention.
Figure 2:
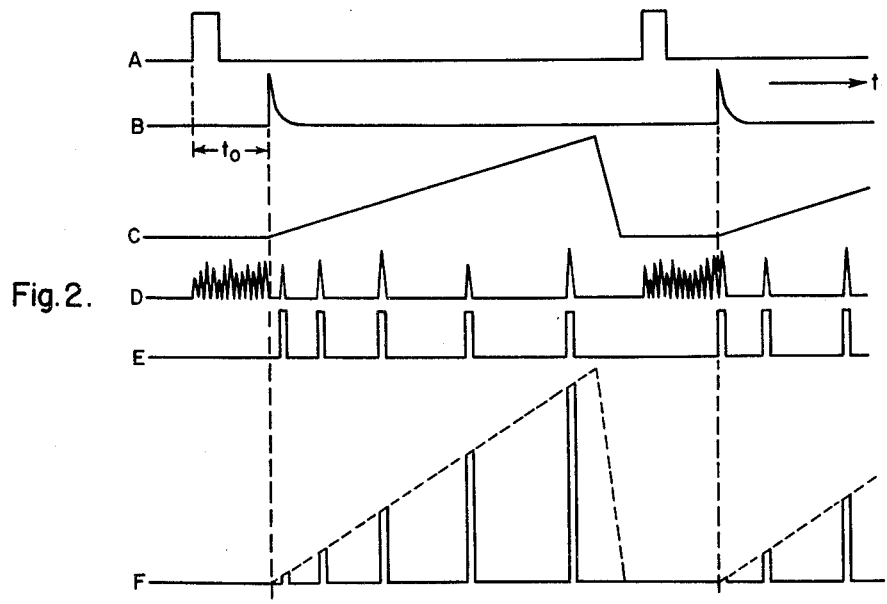
FIG. 2 is an illustration of the functions or waveforms at various points within the block diagram shown in FIG. 1.

The illustrative embodiment of the invention shown in FIG. 1 has a neutron producing device 1 triggered by pulses from a pilot frequency generator 2, which pulses have the waveform indicated at point A in the block diagram and traced in FIG. 2. Neutron "showers" are produced by the neutron producing device 1 in the same rhythm as the impulses from the pilot frequency generator 2. The intervals between the control impulses from the pilot frequency generator 2 may be of the order of 1000 micro-seconds, whereas the duration of producing the neutron "showers" is considerably less, such as in the range of 1 to 10 micro-seconds. After this time or with a certain delay, $t_0$, furnished by a delay element 3, a zero time signal generator 4 is utilized to produce a zero time signal as indicated by the trace B shown in FIG. 2. At the end of their life, the produced neutrons are absorbed over a certain period of time of approximately 100 to 1000 micro-seconds, the distribution of neutrons absorbed at various instances within said period of time being a statistical one. Each neutron absorbed by a neutron counter 6 results in an impulse shown by the trace D in FIG. 2, which is applied to an impulse former 8 through an amplifier 7. When desired, the impulses representing the occurring events may be standardized by such an impulse shaping device as the square impulse former 8 may be formed into a rectangular impulse as shown by the trace E in FIG. 2. The trace E is then applied to a Hall generator 9 to electrically excite the latter. A sawtooth generator 5 is also controlled through the pilot frequency generator 2 and triggered by the zero time signal generator 4 to have an output which is connected to the excitation winding of the Hall generator magnet. The output of the sawtooth generator 5, namely trace C in FIG. 2, has a linearly increasing magnitude during the predetermined period of time within which the random occurring events or phenomena is to be studied.

The resulting Hall voltage from the Hall generator 9 is therefore a measure of the product of the output from the sawtooth generator 5 and the square impulse former 8 and has a resulting trace F shown in FIG. 2. The trace F is applied to an impulse amplitude analyzer 10 which furnishes, in statistical distribution, the time intervals of the neutron absorption impulses reproduced to represent time-proportional amplitudes.

Impulses which it is desired not to consider within a given period of time, $t_0$, for example, during the time neutrons are produced, can be eliminated prior to reaching the Hall generator 9 for multiplication by means of a suppressor gate 11. The action of the suppressor gate 11 results in an output from the square impulse former 8 wherein no output pulses are had during the period of time $t_0$ as shown by the trace E in FIG. 2. Where desirable, the same result may be achieved by means of an amplitude discriminator provided in the impulse amplitude analyzer 10 or such a discriminator may be inserted between the Hall generator 9 and the impulse amplitude analyzer 10. In this case, $t_0=0$, that is, the sawtooth trace C would have an abrupt leading edge but all amplitudes corresponding to a time smaller than the suppression time would be clipped by the discriminator.

Figure 3:
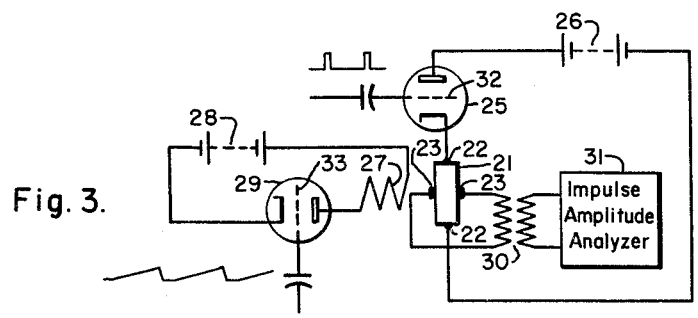
FIG. 3 is a diagram of the circuit connections to the Hall generator utilized in the invention and shown in FIG. 1.

Referring to FIG. 3, a Hall generator device is indicated at 21 having current input terminals 22 and Hall output terminals 23 in the conventional arrangement. The primary circuit connected to the current input terminals 22 includes a cathode follower 25 and a voltage source 26 in series circuit relationship. A magnetic field exciter 27 is serially connected with a voltage source 28 and a control tube 29. Across the Hall output voltage terminals 23 there is connected the primary side of an impulse transformer indicated at 30 and an impulse amplitude analyzer 31 connected across the secondary of the impulse transformer 30.

The momentary events, or phenomena, to be evaluated and which are represented by the rectangular impulses similar to the trace E in FIG. 2 are applied to a control grid 32 of the cathode follower 25 and hence, the primary current over the Hall generator device 21 is correspondingly modulated through the cathode follower. The sawtooth waveform similar to the trace C in FIG. 2 is applied to a control grid 33 of the control tube 29 and correspondingly modulates the excitation current to the magnetic field 27 of the Hall generator. The resulting Hall voltage which, as mentioned previously, is a measure of the amplitude, is applied to the impulse amplitude analyzer 31 through the impulse transformer 30. The impulse transformer 30 is adapted to eliminate the effect of the ohmic voltage change resulting from the change in control current through the Hall generator, said effect being due to the not-entirely-perfect symmetry of the Hall electrodes.

It is readily apparent that the invention finds particular application in connection with the measuring of very short events or phenomena in the order of micro-seconds and milli-seconds. The invention lends itself to the accurate measuring not only of a great number of recurrent events or phenomena, but also of individual or single events or phenomena. With relatively very short time intervals or with high frequencies of recurrence of the time intervals it is to be noted that the time constant of the Hall generator magnet must be correspondingly small.

While a certain specific embodiment of the invention has been shown and described for the purpose of illustration, it is to be understood that various other modifications, embodiments and substitutions may be accomplished without departing from the spirit and scope of the invention.

I claim as my invention:

1. Measurement apparatus for determining the time intervals between momentarily occurring random events in a predetermined period of time comprising, semiconductive means for generating a Hall effect voltage output functionally related to the magnetic field applied thereto and the current flow therethrough, means for applying a magnetic field to said semiconductive means responsive to the magnitude of a linearly increasing signal during said predetermined period of time, and means for applying a current pulse through said semiconductive means responsive to each random event occurring within said predetermined period of time, the magnitude of said output voltage being proportional to the elapsed time within said predetermined period of time.

2. Measurement apparatus for determining the time intervals between momentarily occurring random events in a predetermined period of time comprising, semiconductive means for generating a Hall effect voltage output functionally related to the magnetic field applied thereto and the current flow therethrough, means for applying a magnetic field to said semiconductive means responsive to the magnitude of a linearly increasing signal during said predetermined period of time, and means for applying a standardized current pulse through said semiconductive means responsive to each random event occurring within said predetermined period of time, the magnitude of said output voltage being proportional to the elapsed time within said predetermined period of time.

3. Measurement apparatus for determining the time intervals between momentarily occurring random events in a predetermined period of time comprising, semiconductive means for generating a Hall effect voltage output functionally related to the magnetic field applied thereto and the current flow therethrough, means for applying a magnetic field to said semiconductive means responsive to the magnitude of a linearly increasing signal during said predetermined period of time, circuit means for applying a current flow through said semiconductive means, said circuit means including a biased cathode follower circuit having a control grid and a control circuit for energizing said control grid in accordance with each random event occurring within said predetermined period of time, said current flow being responsive to the energization of said control grid, the magnitude of said output voltage being proportional to the elapsed time within said predetermined period of time.

4. Measurement apparatus for determining the time intervals between momentarily occurring random events in a predetermined period of time comprising, semiconductive means for generating a Hall effect voltage output functionally related to the magnetic field applied thereto and the current flow therethrough, exciter means for magnetically energizing said semiconductive means, said exciter means including a sawtooth generator having an output signal linearly increasing in magnitude with respect to elapsed time within said predetermined period of time, said semiconductive means being magnetically energized in accordance with the magnitude of said output signal, and means for applying a standardized current pulse through said semiconductive means responsive to each random event occurring within said predetermined period of time, the magnitude of said output voltage being proportional to the elapsed time within said predetermined period of time.

5. Measurement apparatus for determining the time interval between random events comprising, means for providing a pulse upon occurrence of each event, means for suppressing said pulses prior to a predetermined period of time, means responsive to each said pulse during said predetermined period of time for providing a signal of uniform magnitude and duration for each said pulse, semiconductive means for generating a Hall effect voltage output functionally related to the magnetic field applied thereto and the current flow therethrough, exciter means for magnetically energizing said semiconductive means, said exciter means including a sawtooth generator having an output signal linearly increasing in magnitude with respect to elapsed time within said predetermined period of time, said semiconductive means being magnetically energized in accordance with the magnitude of said output signal and circuit means for applying a current flow through said semiconductive means, said circuit means including a biased cathode follower circuit having a control grid and a control circuit for energizing said control grid in accordance with each random event occurring within said predetermined period of time, said current flow being responsive to the energization of said control grid, the magnitude of said output voltage being proportional to the elapsed time within said predetermined period of time.

6. An apparatus as claimed in claim 5 in combination with amplitude discriminator means connected to receive said Hall output voltage from said semiconductive means.

7. A method for measuring the time interval between momentarily occurring random events in a predetermined period of time comprising the steps of providing a pulse for each occurrence of an event, converting each said pulse to individual current signals of uniform magnitude and duration, applying said individual current signals to a semiconductive material capable of generating a Hall effect voltage output, directing a magnetic field toward said semiconductive material at an angle displaced from the direction of flow of said current signals, linearly increasing the strength of said magnetic field during said predetermined period of time, and generating a Hall effect voltage as a function of the multiple of the strength of said magnetic field and the magnitude of said individual current signals.

References Cited in the file of this patent

UNITED STATES PATENTS

| | | |
|---|---|---|
| 2,250,708 | Herz | July 29, 1941 |
| 2,685,687 | Walk | Aug. 3, 1954 |

FOREIGN PATENTS

| | | |
|---|---|---|
| 672,625 | Great Britain | May 21, 1952 |